(12) United States Patent
Decrop et al.

(10) Patent No.: US 11,928,451 B2
(45) Date of Patent: Mar. 12, 2024

(54) DYNAMIC MANAGEMENT OF APPLICATION UNINSTALLATION

(71) Applicant: International Business Machines Corporation, Armonk, NY (US)

(72) Inventors: Clement Decrop, Arlington, VA (US); Craig M. Trim, Ventura, CA (US); Jeremy R. Fox, Georgetown, TX (US); Fang Lu, Billerica, MA (US); Uri Kartoun, Cambridge, MA (US)

(73) Assignee: International Business Machines Corporation, Armonk, NY (US)

( * ) Notice: Subject to any disclaimer, the term of this patent is extended or adjusted under 35 U.S.C. 154(b) by 72 days.

(21) Appl. No.: 17/499,982

(22) Filed: Oct. 13, 2021

(65) Prior Publication Data
US 2023/0111056 A1     Apr. 13, 2023

(51) Int. Cl.
G06F 8/61     (2018.01)

(52) U.S. Cl.
CPC ..................... *G06F 8/62* (2013.01)

(58) Field of Classification Search
CPC ............... G06F 8/62; G06F 8/61; G06F 8/77
USPC ......................................................... 717/171
See application file for complete search history.

(56) References Cited

U.S. PATENT DOCUMENTS

| | | | |
|---|---|---|---|
| 10,574,687 B1 * | 2/2020 | Lasser ................. | G06F 8/62 |
| 2016/0154641 A1 * | 6/2016 | Kirkham et al. ........ | G06F 8/61 717/177 |
| 2016/0328225 A1 | 11/2016 | Luk | |
| 2018/0278404 A1 * | 9/2018 | Dotan-Cohen et al. .. | G06F 8/62 |

(Continued)

FOREIGN PATENT DOCUMENTS

JP     4842421 B2     12/2011

OTHER PUBLICATIONS

Mell et al., "The NIST Definition of Cloud Computing", Recommendations of the National Institute of Standards and Technology, Special Publication 800-145, Sep. 2011, 7 pages.

*Primary Examiner* — Wei Y Zhen
*Assistant Examiner* — Mohammed N Huda
(74) *Attorney, Agent, or Firm* — Gilbert Harmon, Jr.; Christopher M. Pignato

(57) ABSTRACT

Systems, methods, and computer programming products for dynamically managing the uninstallation and/or re-installation of software applications stored or accessed by a computing system, including mobile devices. Management of the applications by the system can be periodically managed automatically or based on recommendations. Management of applications being uninstalled or reinstalled may be determined based on a rate a user accesses the application and/or data published or accessible by an application storefront, such as user reviews, storefront rankings, user feedback and uninstallation rates of the applications by other users. Applications experiencing a decreased level of average user satisfaction below a predetermined threshold can be proposed for deletion or automatically deleted. Replacement of underperforming or unsatisfactory applications with alternative applications having similar functionality but a higher rate of user satisfaction can be recommended or installed. Previously uninstalled applications can be recommended or automatically reinstalled upon average user satisfaction rising above configured threshold levels.

17 Claims, 8 Drawing Sheets

(56) References Cited

U.S. PATENT DOCUMENTS

2018/0285947 A1   10/2018  Liu
2018/0341865 A1*  11/2018  Lu ............................ G06F 8/62
2020/0183547 A1    6/2020  Ryu

* cited by examiner

DYNAMIC MANAGEMENT OF APPLICATION UNINSTALLATION

TECHNICAL FIELD

The present disclosure relates generally to the field of software management and more specifically to automated uninstallation or reinstallation of software applications based on rate of user use and metrics of user satisfaction.

BACKGROUND

An application storefront refers to an online portal or platform through which software programs and applications may be made available to customers and users. The customers or users can download, purchase and install the various software applications made available via the application store front and installed applications may be executable by the customer or user's computing device. For example, a desktop, laptop, mobile device, smartwatch or other smart devices. Application storefronts can be cloud-based and may allow users to access the content offered by the online shop for free via client software running on the user's device or may be accessed using a web browser.

Application storefronts often allow users to rank applications and provide feedback about the applications the user has downloaded from the storefront's platform. The feedback being applied by the users can be selected using ratings or rankings which may be pre-defined by the storefront. For example, selecting a star rating from one to five stars, wherein a 1 star rating is selected and applied when a user is unsatisfied with the application and a 5 star rating when the user is extremely satisfied. Moreover, some application storefronts may further provide users an opportunity to provide textual content and reviews of the applications. Users can provide concerns, compliments as well as feedback for improving future versions of the application. Application ranking values within the application storefront may vary over time for a given application. In some cases, applications may encounter a continuous increase or decrease in user satisfaction over time and/or sudden increases or decreases to user satisfaction.

SUMMARY

Embodiments of the present disclosure relate to a computer-implemented method, an associated computer system and computer program products for dynamically managing the uninstallation of software applications based on a user's rate of use and satisfaction metrics measured by an application storefront providing access to the software applications. The computer-implemented method for dynamically managing the software applications comprises analyzing, by a processor, one or more software applications accessed by a user device; collecting, by the processor, one or more logs corresponding to the one or more applications accessed by the user device; calculating, by the processor, a rate that the user device accesses each of the one or more software applications using the one or more logs corresponding to the one or more applications; comparing, by the processor, the rate that the user device accesses the one or more software applications and a metric of user satisfaction presented by an application storefront that provides access to the one or more software applications with a configured threshold level; and managing, by the processor, the uninstallation of the one or more software applications from the user device, wherein the rate that the user device accesses the one or more software applications, or the metric of user satisfaction is below the configured threshold level.

BRIEF DESCRIPTION OF THE DRAWINGS

The drawings included in the present disclosure are incorporated into, and form part of, the specification. The drawings illustrate embodiments of the present disclosure and, along with the description, explain the principles of the disclosure. The drawings are only illustrative of certain embodiments and do not limit the disclosure.

DETAILED DESCRIPTION

Figure 1A:
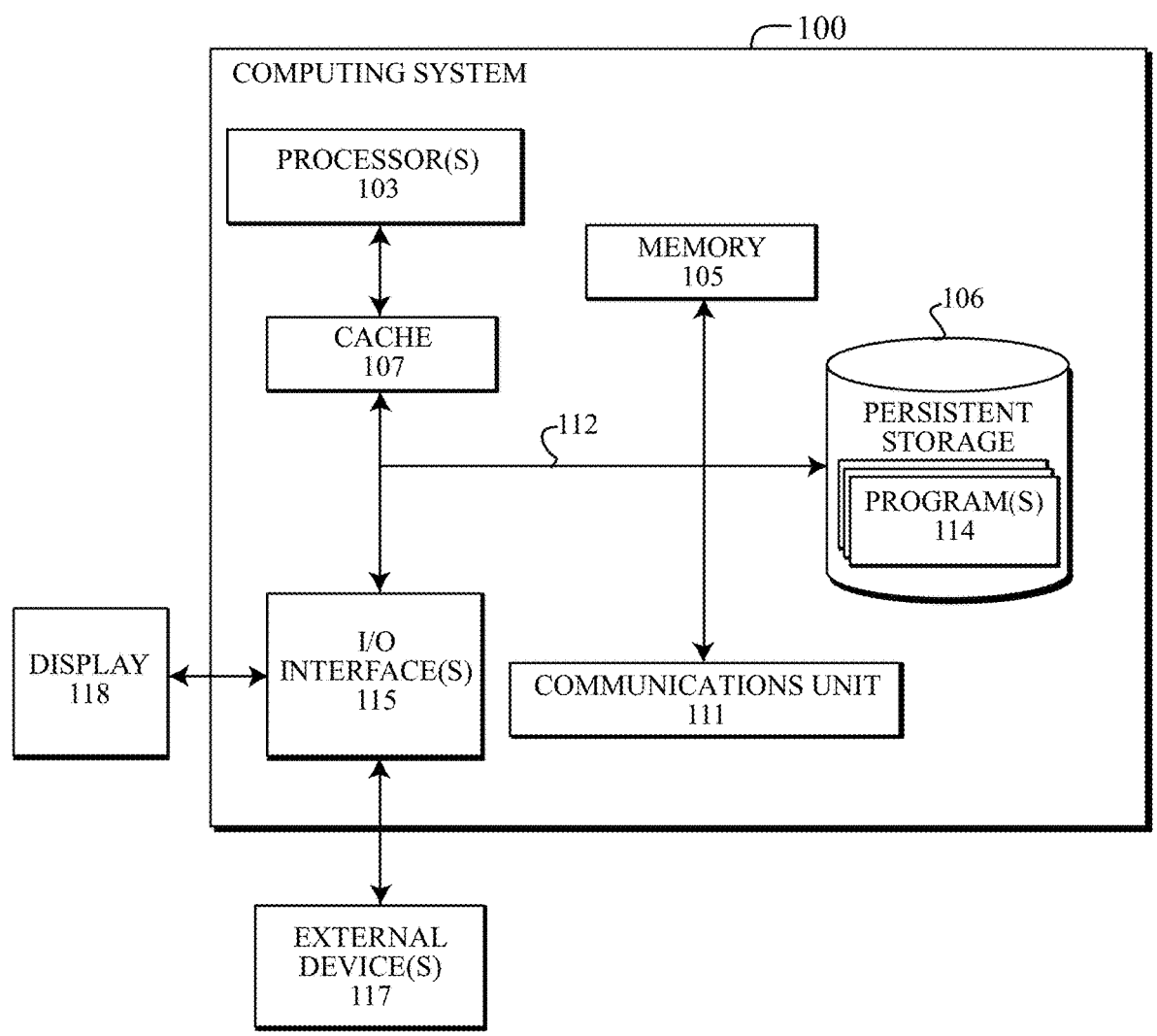
FIG. 1A depicts a block diagram illustrating internal and external components of an embodiment of a computing system in which embodiments described herein may be implemented in accordance with the present disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The corresponding structures, materials, acts, and equivalents of all means or steps plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiments chosen and described are in order to best explain the principles of the disclosure, the practical applications and to enable others of ordinary skill in the art to understand the disclosure for various embodiments with various modifications as are suited to the particular use contemplated.

Overview

Embodiments of the present disclosure recognize that attitudes and opinions of users and the user community for a software application often change over time as new users experience the software application or changes to the software are implemented over time. Application storefronts may help track the overall user sentiment, and changes in sentiment of an application's user community over time. An application's rank value on an application storefront may vary over time as it continuously considers the average of the values provided by all users. For example, an average rank may increase or decrease over time for a given application as new users submit review scores and ratings for the application. The overall use of certain applications may also change over time. Some users may have many apps installed on the user's computing device and certain applications may not be used as often as others. Some of the applications may encounter a continuous decrease in average user satisfaction or may even encounter a sudden decrease. Applications that may start out as immensely popular at a first point in time may cease to remain popular, decline in rankings on an application storefront or cease to be used by the user community at all. Users may uncover bugs in the software that go unaddressed and causes the community to abandon the software over time or even abruptly.

Embodiments of the present disclosure leverage the use of available application storefront data and data analytics techniques to recognize patterns of use and/or metrics that indicate satisfaction of users accessing software applications. For example, metrics indicating user satisfactions might include a rate of application use (i.e., how often the application is accessed), crowd-sourced feedback about applications such as reviews, comments or feedback, popularity rankings organized by the application storefront (i.e., overall rankings or rankings in a particular category), and/or uninstallation rates of an application by other users. Based on collected information indicating a presence or lack of application use and/or user satisfaction, management decisions about maintaining or removing the software application can be automated or recommended. For example, automating or recommending the uninstallation of applications from a user's device that is rarely accessed by the user or where the application storefront data indicates that the application has received negative feedback or ratings by other users of the application. Embodiments of the present disclosure monitor application ratings, rankings, feedback, rates of application access, uninstallation rates, comments on an application storefront, and other metrics of user satisfaction to identify applications accessed by a user's device that may be associated with an overall decrease in an average metric for measuring user satisfaction. Upon the metric for measuring user satisfaction falling below a configured threshold level, embodiments of the present disclosure may propose a user to select whether or not to uninstall the application and/or automatically delete the application from the user's device.

In some embodiments of the present disclosure, alternative software applications with similar functionality to the application associated with an under-performing metric of user satisfaction may be proposed to a user or installed automatically. For example, an installed application for GPS navigation having a metric of user satisfaction below a threshold level, for instance a 1-star or 2-star rating on the application storefront, may be replaced or proposed for replacement with another GPS navigation application having a measure of user satisfaction above a threshold level. In this example, the replacement application may be a GPS navigation application having a 5-star rating on the application storefront based on user submitted ratings or reviews.

In some embodiments of the present disclosure, periodic re-evaluations of installed applications and/or previously uninstalled applications and/or applications accessed or previously accessed by a user device may occur at configured intervals of time. For example, re-evaluations may occur daily, weekly, monthly, etc. During periods of the periodic re-evaluation, embodiments of the present disclosure may compare the user's applications to the current metrics of user satisfaction published by an application storefront, including metrics of user satisfaction for previously uninstalled applications that may have been removed for falling below a configured threshold level of user satisfaction. Application data and lists of applications accessed by users can be push generated or pull generated, depending on the source of the information being collected for the evaluations. For example, application data and logs being push generated may be coming from a cloud based management site or host that maintains user access to the application, whereas pull generated data may be coming from locally stored data of the user's device. In some instances, over time, an application may have improved metrics of user satisfaction that rise above an acceptable threshold level. During re-evaluation periods, an application having a metric of user satisfaction that reaches a threshold level may qualify for re-installation. The previously uninstalled software application may be re-installed back onto the user device automatically or the option to re-install the application may be presented for the user to select whether or not to re-install the application.

Computing System

The present invention may be a system, a method, and/or a computer program product at any possible technical detail level of integration. The computer program product may include a computer-readable storage medium (or media) having the computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including an object-oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer-readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other devices to cause a series of operational steps to be performed on the computer, other programmable apparatus, or other devices to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

FIG. 1A illustrates a block diagram of an embodiment of a computing system 100, which may be a simplified example of a computing device (i.e., a physical bare metal system or virtual system) capable of performing the computing operations described herein for dynamically managing software applications based on rate of use, crowd-sourced feedback and other metrics of user satisfaction. Computing system 100 may be representative of the one or more computing systems or devices implemented in accordance with the embodiments of the present disclosure and further described below in detail. It should be appreciated that FIG. 1A provides only an illustration of one implementation of a computing system 100 and does not imply any limitations regarding the environments in which different embodiments may be implemented. In general, the components illustrated in FIG. 1A may be representative of any electronic device, either physical or virtualized, capable of executing machine-readable program instructions.

Although FIG. 1A shows one example of a computing system 100, a computing system 100 may take many different forms, including bare metal computer systems, virtualized computer systems, container-oriented architecture, microservice-oriented architecture, etc. For example, computing system 100 can take the form of real or virtualized systems, including but not limited to desktop computer systems, laptops, notebooks, tablets, servers, client devices, network devices, network terminals, thin clients, thick clients, kiosks, mobile communication devices (e.g., smartphones), multiprocessor systems, microprocessor-based systems, minicomputer systems, mainframe computer systems, smart devices, sensor device, recording devices, and/or Internet of Things (IoT) devices. The computing systems 100 can operate in a local computing environment, networked computing environment, a containerized computing environment comprising one or more pods or clusters of containers, and/or a distributed cloud computing environment, which can include any of the systems or devices described herein and/or additional computing devices or systems known or used by a person of ordinary skill in the art.

Computing system 100 may include communications fabric 112, which can provide for electronic communications among one or more processor(s) 103, memory 105, persistent storage 106, cache 107, communications unit 111, and one or more input/output (I/O) interface(s) 115. Communications fabric 112 can be implemented with any architecture designed for passing data and/or controlling information between processor(s) 103 (such as microprocessors, CPUs, and network processors, etc.), memory 105, external devices 117, and any other hardware components within a computing system 100. For example, communications fabric 112 can be implemented as one or more buses, such as an address bus or data bus.

Memory 105 and persistent storage 106 may be computer-readable storage media. Embodiments of memory 105 may include random access memory (RAM) and/or cache 107 memory. In general, memory 105 can include any suitable volatile or non-volatile computer-readable storage media and may comprise firmware or other software programmed into the memory 105. Program(s) 114, application(s) 219, processes, services, and installed components thereof, described herein, may be stored in memory 105 and/or persistent storage 106 for execution and/or access by one or more of the respective processor(s) 103 of the computing system 100.

Persistent storage 106 may include a plurality of magnetic hard disk drives, solid-state hard drives, semiconductor storage devices, read-only memories (ROM), erasable programmable read-only memories (EPROM), flash memories, or any other computer-readable storage media that is capable of storing program instructions or digital information. Embodiments of the media used by persistent storage 106 can also be removable. For example, a removable hard drive can be used for persistent storage 106. Other examples include optical and magnetic disks, thumb drives, and smart cards that are inserted into a drive for transfer onto another computer-readable storage medium that is also part of persistent storage 106.

Communications unit 111 provides for the facilitation of electronic communications between computing systems 100. For example, between one or more computer systems or devices via a communication network. In the exemplary embodiment, communications unit 111 may include network adapters or interfaces such as a TCP/IP adapter cards, wireless interface cards, or other wired or wireless communication links. Communication networks can comprise, for example, copper wires, optical fibers, wireless transmission, routers, load balancers, firewalls, switches, gateway computers, edge servers, and/or other network hardware which may be part of, or connect to, nodes of the communication networks including devices, host systems, terminals or other network computer systems. Software and data used to practice embodiments of the present disclosure can be downloaded to the computing systems 100 operating in a network environment through communications unit 111 (e.g., via the Internet, a local area network, or other wide area networks). From communications unit 111, the software and the data of program(s) 114 or application(s) 219 can be loaded into persistent storage 116.

One or more I/O interfaces 115 may allow for input and output of data with other devices that may be connected to computing system 100. For example, I/O interface 115 can provide a connection to one or more external devices 117 such as one or more smart devices, IoT devices, recording systems such as camera systems or sensor device(s), input devices such as a keyboard, computer mouse, touch screen, virtual keyboard, touchpad, pointing device, or other human interface devices. External devices 117 can also include portable computer-readable storage media such as, for example, thumb drives, portable optical or magnetic disks, and memory cards. I/O interface 115 may connect to human-readable display 118. Human-readable display 118 provides a mechanism to display data to a user and can be, for example, computer monitors or screens. For example, by displaying data as part of a graphical user interface (GUI). Human-readable display 118 can also be an incorporated display and may function as a touch screen, such as a built-in display of a tablet computer.

Figure 1B:
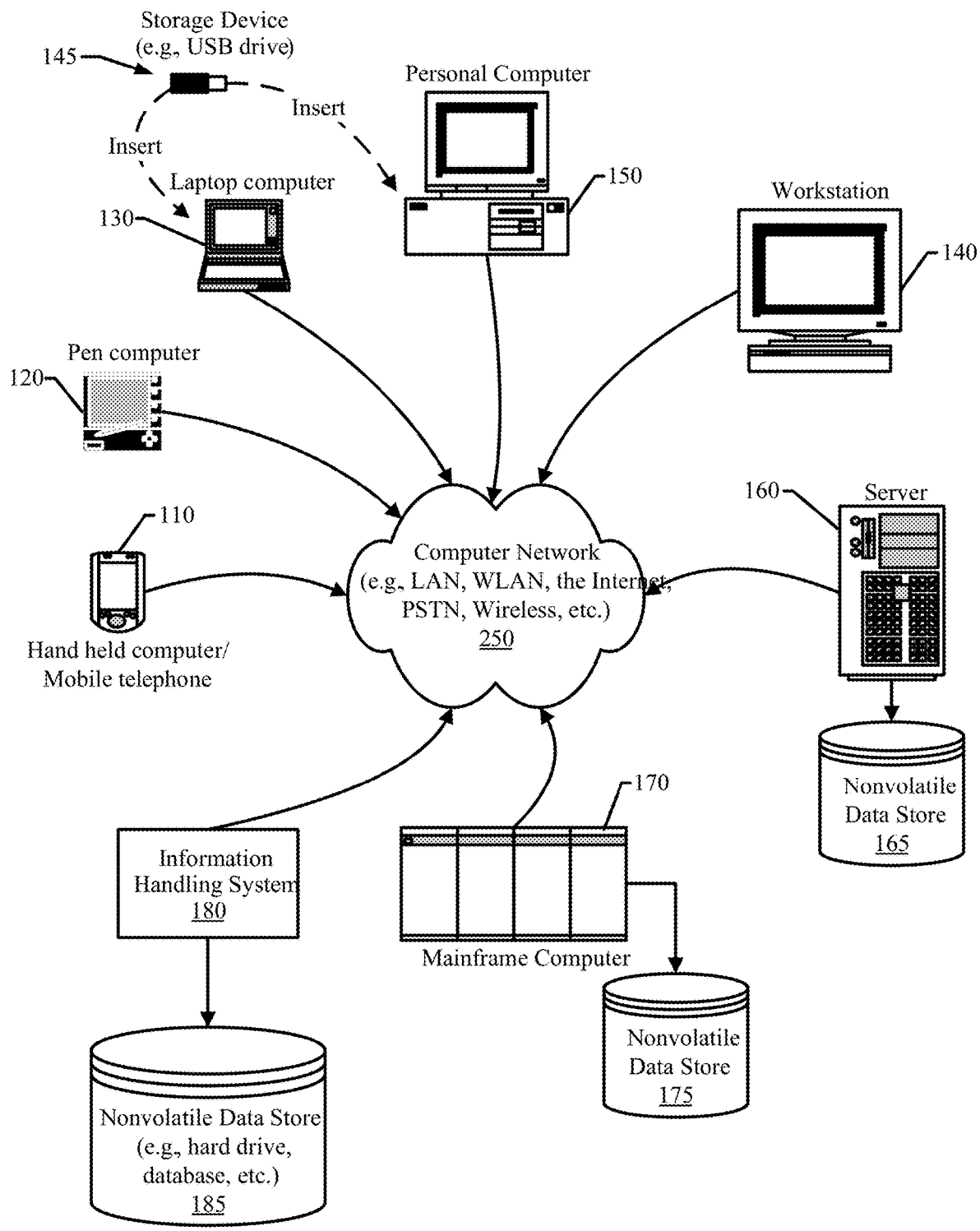
FIG. 1B depicts a block diagram illustrating an extension of the computing system environment of FIG. 1A, wherein the computing systems are configured to operate in a network environment and perform methods described herein in accordance with the present disclosure.

FIG. 1B provides an extension of the computing system 100 environment shown in FIG. 1A to illustrate that the methods described herein can be performed on a wide variety of computing systems that operate in a networked environment. Types of computing systems 100 may range from small handheld devices, such as handheld computer/mobile telephone 110 to large mainframe systems, such as mainframe computer 170. Examples of handheld computer 110 include personal digital assistants (PDAs), personal entertainment devices, such as Moving Picture Experts Group Layer-3 Audio (MP3) players, portable televisions, and compact disc players. Other examples of information handling systems include pen, or tablet, computer 120, laptop, or notebook, computer 130, workstation 140, personal computer system 150, and server 160. Other types of information handling systems that are not individually shown in FIG. 1B are represented by information handling system 180. As shown, the various computing systems 100 can be networked together using computer network 250. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the computing systems 100. Many of the computing systems include nonvolatile data stores, such as hard drives and/or nonvolatile memory. The embodiment of the information handling system shown in FIG. 1B includes separate nonvolatile data stores (more specifically, server 160 utilizes nonvolatile data store 165, mainframe computer 170 utilizes nonvolatile data store 175, and information handling system 180 utilizes nonvolatile data store 185). The nonvolatile data store can be a component that is external to the various computing systems or can be internal to one of the computing systems. In addition, removable nonvolatile storage device 145 can be shared among two or more computing systems using various techniques, such as connecting the removable nonvolatile storage device 145 to a USB port or other connector of the computing systems.

System for Dynamically Managing the Uninstallation of Software Applications

It will be readily understood that the instant components, as generally described and illustrated in the Figures herein, may be arranged and designed in a wide variety of different configurations. Accordingly, the following detailed description of the embodiments of at least one of a method, apparatus, non-transitory computer readable medium and system, as represented in the attached Figures, is not intended to limit the scope of the application as claimed but is merely representative of selected embodiments.

The instant features, structures, or characteristics as described throughout this specification may be combined or removed in any suitable manner in one or more embodiments. For example, the usage of the phrases "example embodiments," "some embodiments," or other similar language, throughout this specification refers to the fact that a particular feature, structure, or characteristic described in connection with the embodiment may be included in at least one embodiment. Accordingly, appearances of the phrases "example embodiments," "in some embodiments," "in other embodiments," or other similar language, throughout this specification do not necessarily all refer to the same group of embodiments, and the described features, structures, or characteristics may be combined or removed in any suitable manner in one or more embodiments. Further, in the Figures, any connection between elements can permit one-way and/or two-way communication even if the depicted connection is a one-way or two-way arrow. Also, any device depicted in the drawings can be a different device. For example, if a mobile device is shown sending information, a wired device could also be used to send the information.

Figure 2:
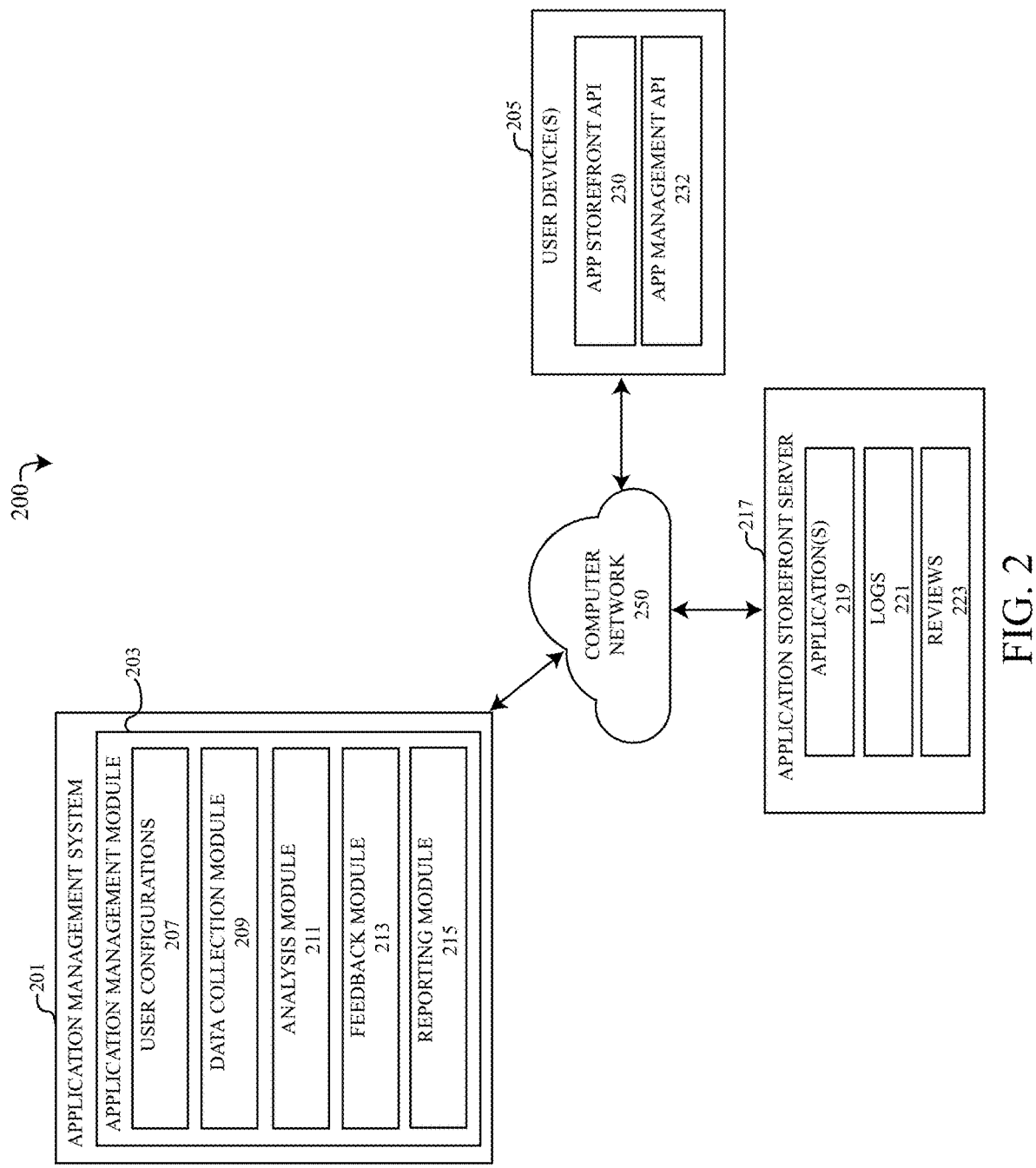
FIG. 2 depicts a functional block diagram describing an embodiment of a computing environment for dynamically managing the uninstallation of software applications based on user ratings or other crowd-sourced feedback, in accordance with the present disclosure.
Figure 3:
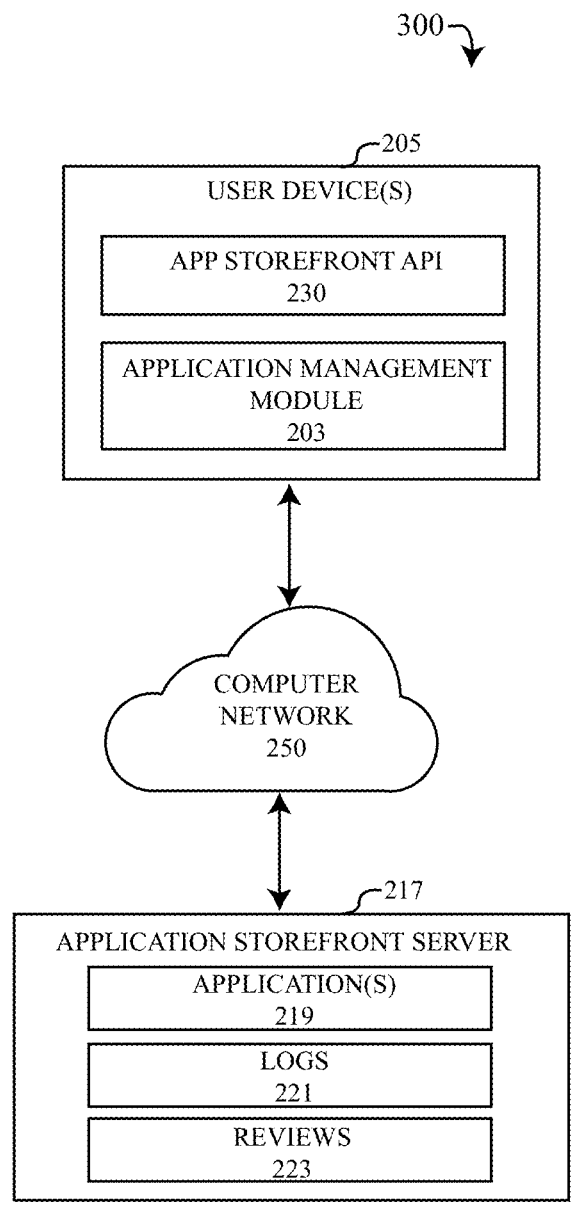
FIG. 3 describing an alternate embodiment of a computing environment for dynamically managing the uninstallation of software applications based on user ratings or other crowd-sourced feedback, in accordance with the present disclosure.

Referring to the drawings, FIG. 2 to FIG. 3 depict an approach that can be executed using one or more computing systems 100 within a computing environment 200, 300, 400 and variations thereof, to implement systems, methods, and computer program products for dynamically managing the software applications based on a user's rate of use and crowd-sourced feedback which may be maintained by an application storefront, such as user ratings, rankings and other metrics for measuring user satisfaction with the applications being used or accessed by a user. Embodiments of computing environments 200, 300, 400 may include one or more computing systems 100 interconnected via a computer network 250. In the exemplary embodiments depicted in FIGS. 2-3. the computing systems 100 connected to the computing network 250 may be specialized systems or devices that may include, but are not limited to, the interconnection of one or more application management system 201, user device(s) 205 and/or application storefront server 217. While application management system 201, user device(s) 205 and/or application storefront server 217 may be interconnected via network 250 as shown, other types of computing systems and devices known or used by a person skilled in the art, may be interconnected as well and/or may be substituted for the computing systems depicting in the Figures.

Embodiments of the specialized computing systems or devices exemplified in FIGS. 2-3 may not only comprise the elements and components of the systems and devices depicted in the exemplary embodiments of FIGS. 2-3 as shown, but the specialized computing systems depicted may further incorporate one or more elements or components of computing system 100 shown in FIG. 1A and described above. Although not shown in the Figures, one or more elements of computing system 100 may be integrated into the embodiments of application management system 201, user device(s) 205 and/or application storefront server 217, wherein the components integrated into the specialized computing systems include (but are not limited to) one or more processor(s) 103, program(s) 114, memory 105, persistent storage 106, cache 107, communications unit 111, I/O interface(s) 115, external device(s) 117 and human-readable display 118.

Embodiments of network 250 may be constructed using wired, wireless or fiber-optic connections. Application management system 201, user device(s) 205 and/or application storefront server 217, whether real or virtualized, may communicate over the network 250 via a communications unit 111, such as a network interface controller, network interface card, network transmitter/receiver or other network communication device capable of facilitating communication across network 250. In some embodiments of computing environments 200, 300, 400, application management system 201, user device(s) 205 and/or application storefront server 217 may represent computing systems 100 utilizing clustered computing and components acting as a single pool of seamless resources when accessed through network 250. For example, such embodiments can be used in a datacenter, cloud computing network, storage area network (SAN), and network-attached storage (NAS) applications.

Embodiments of the communications unit 111 such as the network transmitter/receiver may implement specialized electronic circuitry, allowing for communication using a specific physical layer and a data link layer standard. For example, Ethernet, Fiber channel, Wi-Fi or other wireless radio transmission signals, cellular transmissions or Token Ring to transmit data between the application management system 201, user device(s) 205 and/or application storefront server 217 connected to network 250. Communications unit 111 may further allow for a full network protocol stack, enabling communication over network 250 to groups of computing systems 100 linked together through communication channels of network 250. Network 250 may facilitate communication and resource sharing among application management system 201, user device(s) 205 and/or application storefront server 217. Examples of network 250 may include a local area network (LAN), home area network (HAN), wide area network (WAN), backbone networks (BBN), peer to peer networks (P2P), campus networks, enterprise networks, the Internet, cloud computing networks, wireless communication networks and any other network known by a person skilled in the art.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. A cloud model may include at least five characteristics, at least three service models, and at least four deployment models.

Characteristics are as follows:
  On-demand self-service: a cloud consumer can unilaterally provision computing capabilities, such as server time and network storage, as needed automatically without requiring human interaction with the service's provider.
  Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
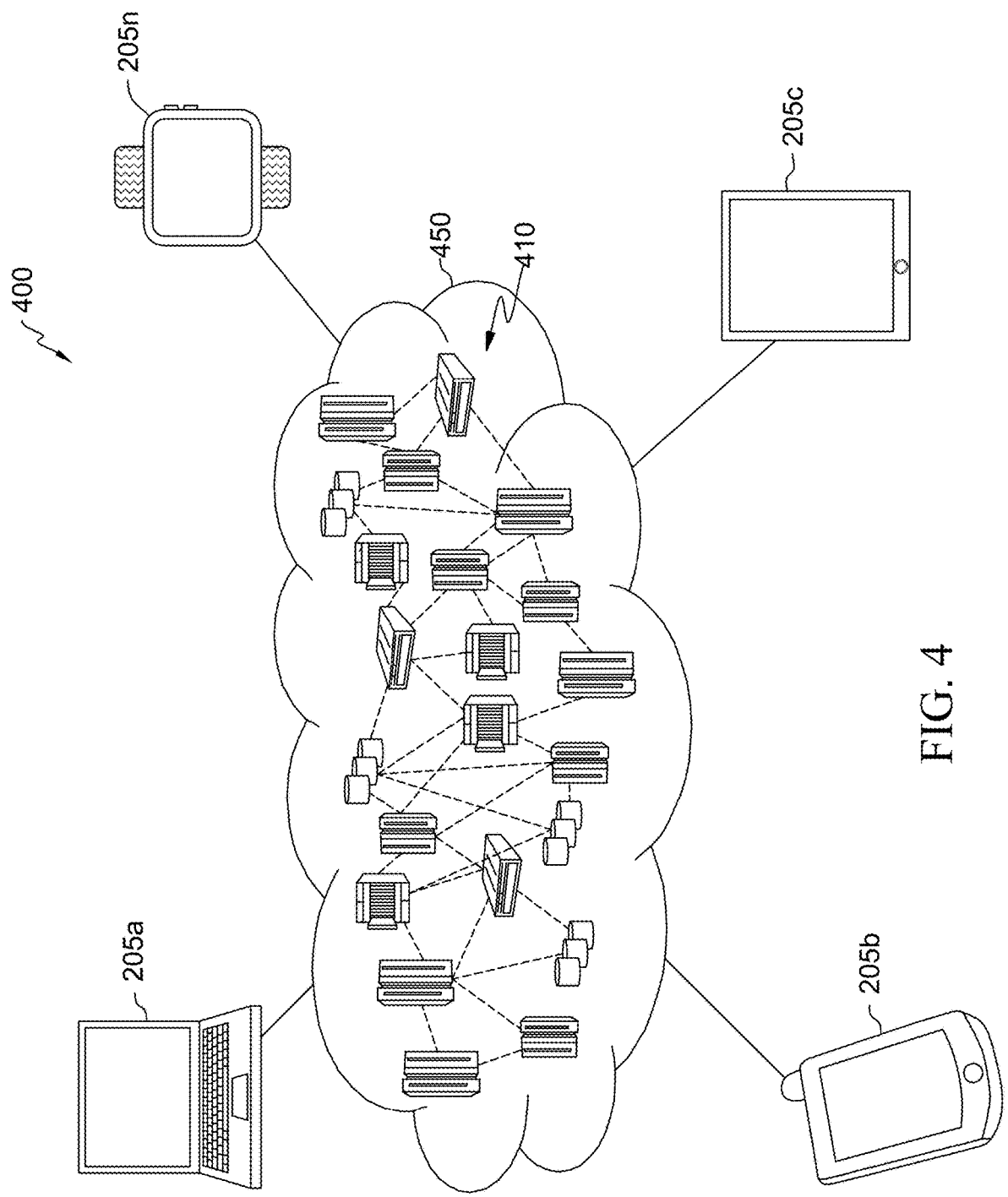
FIG. 4 depicts a block diagram illustrating a cloud computing environment in accordance with the present disclosure.

Referring to the drawings, FIG. 4 is an illustrative example of a cloud computing environment 400. As shown, cloud computing environment 400 includes a cloud network 450 comprising one or more cloud computing nodes 410 with which end user device(s) 205 may be used by cloud consumers to access one or more software products, services, applications, and/or workloads provided by cloud service providers. Examples of the user device(s) 205 are depicted and may include devices such as a smartphone 205b or cellular telephone, desktop computers, laptop computer 205a, tablet computers 205c and smart devices such as a smartwatch 205n and smart glasses. Nodes 410 may communicate with one another and may be grouped (not shown) physically or virtually, in one or more networks, such as Private, Community, Public, or Hybrid clouds as described hereinabove, or a combination thereof. This allows cloud computing environment 400 to offer infrastructure, platforms and/or software as services for which a cloud consumer does not need to maintain resources on a local computing device. It is understood that the types of end user devices shown in FIG. 4 are intended to be illustrative only and that computing nodes 410 of cloud computing environment 400 can communicate with any type of computerized device over any type of network and/or network addressable connection (e.g., using a web browser).

Figure 5:
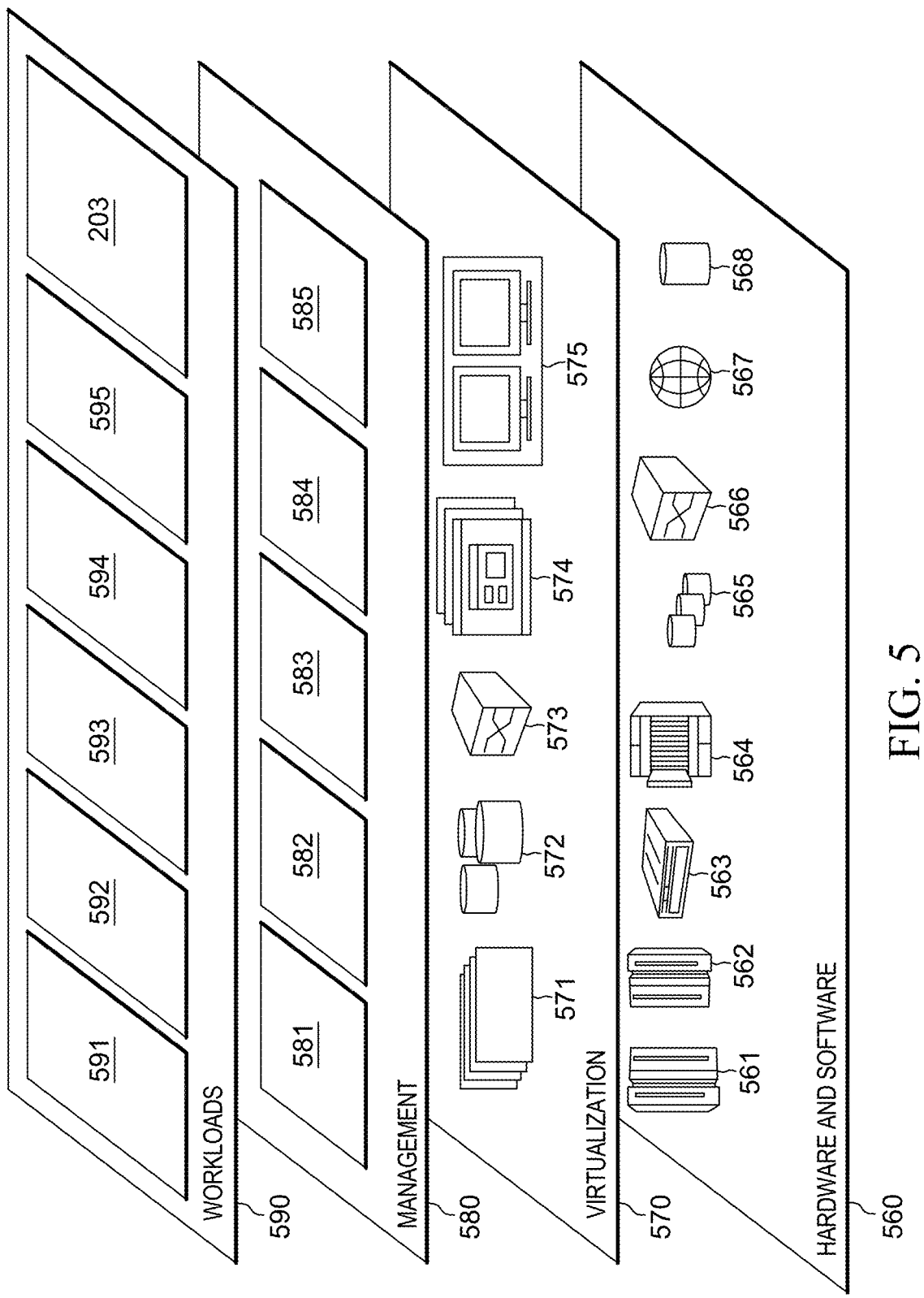
FIG. 5 depicts an embodiment of abstraction model layers of a cloud computing environment in accordance with the present disclosure.

Referring now to FIG. 5, a set of functional abstraction layers provided by cloud computing environment 400 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 560 includes hardware and software components. Examples of hardware components include mainframes 561; RISC (Reduced Instruction Set Computer) architecture-based servers 562; servers 563; blade servers 564; storage devices 565; and networks and networking components 566. In some embodiments, software components include network application server software 567 and database software 568.

Virtualization layer 570 provides an abstraction layer from which the following examples of virtual entities may be provided: virtual servers 571; virtual storage 572; virtual networks 573, including virtual private networks; virtual applications and operating systems 574; and virtual clients 575.

Management layer 580 may provide the functions described below. Resource provisioning 581 provides dynamic procurement of computing resources and other resources that are utilized to perform tasks within the cloud computing environment 400. Metering and pricing 582 provide cost tracking as resources are utilized within the cloud computing environment 400, and billing or invoicing for consumption of these resources. In one example, these resources can include application software licenses. Security provides identity verification for cloud consumers and tasks, as well as protection for data and other resources. User portal 583 provides access to the cloud computing environment 400 for consumers and system administrators. Service level management 584 provides cloud computing resource allocation and management such that required service levels are met. Service Level Agreement (SLA) planning and fulfillment 585 provide pre-arrangement for, and procurement of, cloud computing resources for which a future requirement is anticipated in accordance with an SLA.

Workloads layer 590 provides examples of functionality for which the cloud computing environment may be utilized. Examples of workloads and functions which may be provided from this layer include software development and lifecycle management 591, data analytics processing 592, multi-cloud management 593, transaction processing 594; database management 595 and application management module 203.

Referring back to the drawings, FIG. 2 illustrates an embodiment of a computing environment 200 capable of dynamically managing software applications being accessed or installed by one or more user device(s) 205 based on or more factors, including rates of the application(s) 219 being accessed or used by user device(s) 205, one or more metrics of user satisfaction, including (but not limited to) uninstallation rates, user ratings, reviews, comments, feedback, rankings, and/or other forms of crowd-sourced data provided by an application storefront server 217. Embodiments of the computing environment 200 depicts a centralized or de-centralized network comprising a distribution of real or virtualized computing nodes communicating with one another across network 250. A "node" of network 250 may refer to a connection point, redistribution point or a communication endpoint of the network 250. In the exemplary embodiment, computing environment 200 may comprise nodes such as an application management system 201, one or more user device(s) 205 and/or an application storefront server 217. In alternative embodiments, such as the computing environment 300 depicted in FIG. 3, the user device(s) may incorporate one or more functions or features of the application management system 201 into the user device 205 as discussed in more detail below.

Embodiments of the application management system 201 may be responsible for dynamically managing the installation or uninstallation of application(s) 219 provided to user device(s) 205 via an application storefront server 217 or other host system. The functions, tasks and services of the application management system 201 associated with the management of the one or more application(s) 219 may be provided to the user device 205 by an application management module 203. The term "module" may refer to a hardware module, software module, or a module may be a combination of hardware and software resources. Embodiments of hardware-based modules may include self-contained components such as chipsets, specialized circuitry, one or more memory 105 devices and/or persistent storage 106. A software-based module may be part of a program 114, program code or linked to program code containing specifically programmed instructions loaded into a memory 105 device or persistent storage 106 device of one or more specialized computing systems 100 operating as part of the computing environment 200, 300. In some embodiments, application management module 203 may include components or sub-modules performing one or more specialized tasks, processes, functions or services of the application management module 203. For instance, in the exemplary embodiment depicted in FIG. 2, the application management module 203 comprises user configurations 207, a data collection module 209, analysis module 211, feedback module 213 and/or a reporting module 215.

Embodiments of user device(s) 205 may interface with the application management module 203 via an application management API 232 (referred to herein as "app management API 232"). Users accessing the application management module 203 of the application management system 201 via the app management API 232 may setup and configure the application management module 203 with customized settings that can be created or updated by the user. The user's customized settings and user configurations 207 may be stored to the application management system 201, locally to the user device(s) 205 or remotely to another computing system accessible via network 250. User configurations 207 can be customized to include user preferences and system policies for opting into or out of the management of application(s) 219 stored or accessed by user device(s) 205 and the associated data collected and/or analyzed by the application management module 203. For instance, user configurations 207 may establish policies for the collection of data describing application(s) 219 accessed or used by the user device(s) 205, and logs 221 associated with the application(s) 219 of the user device(s) 205. For example, users opting into the application management module 203 may grant permission for the application management module 203 to scan and evaluate all application(s) 219 accessed or installed onto user device(s) 205 and collect logs 221 for each application(s) 219, whether stored by user device 205, the application storefront server 217 or another host system.

User device(s) 205 creating or updating user configurations 207 via the app management API 232 may include settings establishing privacy controls. For example, user configurations 207 can set policies to anonymize data collected or accessed by the application management module 203, including but not limited to the anonymization of data collected by the data collection module 209. For example, anonymization of user information that may be otherwise identifiable within logs 221 and application-specific data derived from the usage of one or more application(s) 219 by the user device(s) 205. By configuring the user configurations 207 to allow application management module 203 to collect anonymized data, insights can be gained by analyzing how users and user device(s) 205 are interacting with certain application(s) 219 and correlate the collected data to the input and output of the data generated and/or shared with potential users of one or more application(s) 219. Such a configuration may allow for a deeper understanding of the content and data usage patterns for uninstallation suggestions and/or future installations of application(s) 219 without revealing personal user information.

User configurations 207 may be created or updated to establish threshold limits for uninstalling or reinstalling one or more application(s) 219. Users of the application management module 203 may manually specify one or more parameters and/or metrics of user satisfaction that may result in uninstalling or reinstalling an application 219 automatically or prompting a user to select a managing action to uninstall or reinstall an application 219. For example, user configurations 207 may be created to set a manual threshold for uninstallation of an application 219 upon metrics of user satisfaction falling below a specific level. For instance, an average user rating falling below two out of five stars, below 50%, etc. In other instances, the threshold may be set as part of the user configurations 207 based upon a rate of uninstallations of the application(s) 219 by users. For example, when an application storefront observes a large enough uninstallation rate of an application 219 or a large enough change in the percentage of the installed application 219 being removed over a set period of time, the application management module 203 may uninstall the application 219 from the user device(s) 205. In some embodiments, user configurations 207 may be set thresholds for uninstallation of an application 219 based on the percentage change to the uninstallation rate and/or metrics of user satisfaction, such as ratings on the application storefront, but only upon a certain number of ratings (or other metrics of user satisfaction) arise above a threshold level. For example, an application 219 may be automatically managed or recommended for uninstallation upon user ratings falling below 30% on the application storefront, but only upon at least 100 ratings or more being recorded. If the ratings fall below 30% and the number of ratings is below 100, user configurations 207 may indicate that the application management module 203 will not uninstall or recommend uninstallation of the application 219 until the ratings of the application 219 are re-evaluated with the requisite number of ratings recorded by the application storefront.

In some embodiments where the user configurations 207 may lack a manually selected thresholds established by the user, threshold parameters such as uninstallation rate, the percentage change for removal of an application 219 by application storefront users, threshold levels for ratings, rankings and other metrics for measuring user satisfaction with the application 219 along with threshold levels for removing or reinstalling an application 219 may be automatically configured by the application management module 203. For example, threshold levels may be a calculated average or median threshold level for a community of users who also use the application management module 203 to manage applications 219 on a user device 205. In some embodiments, various techniques such as linear regression may be used to develop threshold levels, such as uninstallation rates that trigger automatic uninstallation of applications. For example, the threshold level for uninstallation rates may be established by calculating a score, wherein the Score=(percentage change)*(weight)+(percent of uninstalls) *(weight). In other embodiments, a threshold percentage level for users uninstalling the application may trigger automatic uninstallation or prompt a user with an uninstallation recommendation. For instance, if threshold percentage of users of an application 219 uninstall the application 219 within a defined period of time, application management module 203 may push a notification to the user device 205 requesting permission to uninstall the application 219.

In some embodiments, during the setup or update of user configurations 207, a user may set a triggering flag for uninstallation of an application 219 to "autonomous" or "manual". When a triggering flag is set to autonomous, automatic uninstallation of one or more applications 219 may be performed and/or reported to the user by the application management system 201 upon meeting the threshold requirements for managing an application installed or accessible by the user device 205. For example, upon a metric of user satisfaction, such as ratings or rankings of an application falling below a threshold level established by the user configurations 207 occurs, if the user configurations 207 set the triggering flag to autonomous, the application management module 203 automatically uninstalls the application 219 and may report the removal of the application 219 to the user via a notification or report displayed by the user device 205. In contrast, situations where the triggering flag for uninstallation of the application 219 is set to manual within the user configurations 207, upon the application management module 203 determining the application 219 meets a threshold requirement for uninstallation, instead of automatically removing the application 219 from the user device 205, the application management module 203 may notify the user or recommend removal of an application 219. For example, by pushing a notification to the user device 205 that may provide a user input through the app management API 232, allowing the user to select whether to uninstall the application 219.

Embodiments of user configurations 207 may further include one or more time frames for re-evaluating application(s) 219 and threshold levels for one or more parameters. For example, time frames for re-evaluating a usage rate or uninstallation rate of application(s) 219 can be set to be configured for daily, weekly, monthly, yearly, etc. In the instances where the uninstallation of an application is measured based on how many users of an application storefront are removing an application 219 and the user configurations 207 has been set to a weekly time frame, the uninstallation may measure the number of uninstallations per week. Likewise, where the time frame is set to monthly, the application management module 203 can calculate uninstallations per month. Similarly, time frames for usage rate by the user of an application can be similarly calculated to evaluate the frequency of usage by the user. For example, a user accessing the application 219 a number of times per day, per week, per month, per year, etc. Furthermore, time frames can be setup by the user configurations 207 to re-evaluate whether or not applications 219 should be uninstalled or reinstalled, as discussed in greater detail below. For example, the application management module 203 may be set to manage applications 219 of a user device 205 once per day, once per week, once per month, etc. and/or a plurality times per day, week month, or year.

Embodiments of the application management module 203 may include a data collection module 209. The data collection module 209 may perform tasks, functions or processes associated with collecting and retrieving application data, logs 221, reviews 223 or other crowd-sourced feedback and/or metrics of user satisfaction associated with application(s) 219, from one or more user device(s) 205 and/or application storefront server 217. Embodiments of the data collection module 209 may periodically scan a user device 205 configured to opt-in to the data collection policies of the application management module 203 at configured intervals of time or a time frame established by the user configurations 207. Upon scanning user device(s) 205, data collection module 209 may identify one or more applications 219 installed, used or accessed by the user device 205. Once each of the applications 219 are identified, the data collection module 209 may communicate with the user device 205 and/or the application storefront data server 217 to request and retrieve application-related data, crowd-sourced feedback published by the application storefront server 217, logs 221 associated with each application 219, and other metrics of user satisfaction that may be stored or available via the application storefront. For example, Crowd-sourced feedback that may be available on an application storefront server 217 may include user reviews 223 of an application 219, application ratings, comments, published feedback or suggestions by users, overall rankings of applications 219 as measured against other applications 219 available via the application storefront, application rankings based on category, and/or uninstallation rates as logged by one or more logs 221 for the application(s) 219. Logs 221 may also record instances or sessions between app storefront API 230 of user device 205 and the application storefront server 217 to track numbers of application downloads and/or installations, uninstallations, application use or access and other interactions between user devices and the application storefront server 217.

Embodiments of analysis module 211 may perform tasks, functions and processes of the application management module 203 directed toward periodic evaluation and analysis of the data collected by the data collection module 209. Analysis module 211 may, based on the user configurations 207 and programmed logic, determine how to manage applications 219 installed on the user device 205, make recommendations for managing applications 219 based on rate of application use, and/or one or more metrics of user satisfaction of the application 219 and apply one or more managing actions to the applications 219. Examples of managing actions may include uninstallation of applications 219, re-installation of a previously uninstalled application and/or recommendations for installation or uninstallation of applications 219. Where an application 219 is used or accessed often by the user device 205 via the app storefront API 230, for example, daily or multiple times per week, the application 219 may not be further evaluated for whether to uninstall the application.

In situations where an application 219 installed on a user device 205 is never used, or rarely used, but the data from the application storefront indicates a very high level of user satisfaction, such as high ratings or top rankings to be considered one of the best applications offered by the application storefront, the analysis module 211 may not identify the application 219 for uninstallation or automatic removal from the user device 205 despite a low rate of use. In contrast, an application 219 that is rarely (or never) used or accessed by a user device 205 and the application data and/or metrics of user satisfaction from the application storefront server 217 indicate the application 219 is unsatisfactory to users of the application storefront, analysis module 211 can recommend the application 219 for uninstallation and/or automatically remove the application 219, based on the user configurations 207 of the application management module 203. For example, an application that is rarely used or accessed by a user device 205 along with average ratings below a threshold level that may be considered poor ratings, critical reviews 223, or feedback indicating issues with the application 219, the application 219 may be considered a target by the analysis module 211 to recommend uninstallation of the applications 219 and/or automatic uninstallation.

Embodiments of the analysis module 211 can identify applications 219 installed or accessed by a user device 205 and determine the rate of use of the application 219 based on logs 221 maintained by the application storefront server 217 or locally stored by the user device 205. Embodiments of the analysis module 211 may evaluate and determine using the logs 221, how often a user may be accessing installed applications 219 over a set period of time. For example, analysis module 211 may analyze application use per day, per week, per month, etc. The rate of use for applications may be categorized by the analysis module 211 based on comparison with a user's rate of use for other applications accessed by the same user, average rates of use by other users for the same application and/or predicted thresholds considered to be rarely used, sparingly used, semi-frequently used, and frequently used. Whether or not an application is used frequently or infrequently may depend on the type of application 219. For example, a rate of use for a GPS navigation application once per week may be considered to be semi-frequently or frequently used compared with the average rate of use by other users of the GPS navigation application, whereas using a social media application once per week may be considered being used only semi-frequently or sparingly compared with the average use of other users who may be accessing the same application dozens of times per day.

Embodiments of the analysis module 211 may not only consider the overall metrics for user satisfaction such as rankings, ratings, reviews, and other types of crowd-sourced feedback available on the application storefront and compare those overall metrics with a threshold to determine whether or not to uninstall or recommend uninstallation of an application 219 from a user device 205, but rather, in some embodiments, metrics for user satisfaction can be normalized by the analysis module 211 based on the type or category of application 219 being evaluated. For example, ratings for an application can be compared to average ratings of applications 219 that are similar in nature or categories identified by the application storefront. For instance, ratings, rankings and other metrics of user satisfaction for applications 219 categorized as "free games" can be compared against metrics of user satisfaction of other applications 219 within the "free games" category. Similarly, productivity applications such as word processors, publishing, social media applications, photography, image editing, etc., can be compared to other applications within the productivity application category. In other instances, the particular category could be refined even further for the purpose of comparing metrics of user satisfaction. For example, comparing productivity applications may be even more granular by comparing metrics of user satisfaction for types of applications within a category or sub-categories, such as comparing a word processor application used by a user device 205 with other word processors rather than including metrics of user satisfaction for other types of applications within the productivity application category.

Embodiments of the analysis module 211 may use different techniques for grouping applications 219. In some embodiments, rankings of applications 219 may be determined by the application storefront, wherein the application storefront may have an overall ranking, and rankings within a category or sub-category. Thresholds may be configured to determine whether or not to uninstall an application based on ranking. For example, a threshold may be established for a minimum overall ranking and/or ranking within a more refined category. If an unused or rarely used application falls below the minimum ranking overall and/or within a particular category, the application 219 may be recommended for uninstallation or automatically uninstalled. Another technique for grouping applications may be performed by the analysis module 211. Rather than relying on the application storefront to establish groupings by ranking or category, embodiments of the analysis module 211 may group applications by some form of K-means clustering and may order the applications 219 by average ratings or other metrics for user satisfaction, as provided by the application storefront to create a customize ranking with a custom threshold for uninstallation.

In some embodiments, the analysis module 211 may leverage the use natural language processing (NLP) to analyze reviews 223, comments and feedback left by users with the application storefront. NLP techniques may be used to process the text of the reviews 223, comments, feedback to determine overall tone in the text of the metrics for user satisfaction. If certain tones and sentiment of the reviews, comments, feedback, and other types of textualized metrics of user satisfaction with the application 219, for example, joy, happiness or other positive sentiments are below a threshold level and/or other negative sentiments such as anger, sadness, frustration, etc., are above a defined threshold level, then the analysis module 211 may recommend removal of the application and/or conduct automated managing actions to uninstall the application 219 from a user device 205.

Embodiments of the analysis module 211 may periodically analyze application data and logs 221 collected by data collection module 209 and perform managing actions on applications 219 of the user device 205 at configured intervals or points in time. For example, upon first setting up and granting permission to the application management module 203, the data collection module 209 can scan user device 205 for applications 219 used or accessed by the user device, retrieve application data and logs 221 associated with the identified applications during the scan. During the first time use after setup, initial list of applications 219 and recommendations or managing actions for uninstalling the applications 219 may be identified by the analysis module 211. After the first use, the re-evaluation of existing applications accessed or used by the user device 205 may be performed by the analysis module 211, along with analysis of previously uninstalled applications, at the configured intervals or points in time. Analysis module 211 may recommend or automatically reinstall a previously uninstalled application in situations where the application 219 improves metrics of user satisfaction over time above a threshold level. For example, if a previously uninstalled application develops an average rating above a threshold level or a ranking above a threshold level, analysis module 211 may automatically reinstall the previously uninstalled applications or prompt a user with a recommendation to reinstall the previously uninstalled application. In some embodiments, application management module 203 may even restore an icon of the previously uninstalled application to the same position on the user device's interface where the application resided prior to the uninstallation.

In addition to recommending one or more applications 219 for removal or automatically removing applications, embodiments of the analysis module 211 may further identify and propose alternative applications to replace existing applications of the user device that may be uninstalled due to having a metric of user satisfaction below a threshold level. Application management module 203 may query an application storefront server 217 for available applications 219 that may have similar functionality and/or be similarly categorized by the application storefront as an application 219 being removed or recommended for removal by the analysis module 211. Analysis module 211 may order available alternatives based on ratings, reviews, rankings, comments, feedback, low uninstallation rates and/or other metrics of user satisfaction, as well as similarities to the functionalities of the application being removed or recommended for removal from the user device 205. Analysis module 211 may select an alternative application for recommendation to a user based on a balance between the highest metrics of user satisfaction and/or how closely similar in functionality the alternative application is to the application being recommended for removal. Users receiving proposed recommendations may confirm whether to install the alternative application or deny installation via the app management API 232. Upon confirmation, the application management module 203 may initiate installation of the alternative application onto the user device 205 via the application storefront server 217.

Embodiments of the analysis module 211 may further examine distribution of usage time for a given application 219. In some instances, many of the applications offered by the application storefront may include applications that have a limited, transient usage. A user may download and install the application 219 for a defined length of time, wherein the application 219 may be generally ignored by the user thereafter and could be uninstalled. Embodiments of the analysis module 211 can identify distribution of a length of usage by users of a particular application and calculate a mean or median usage time before a particular application may be ignored or uninstalled by other users within a community of users. Textual reviews, comments, user feedback and application usage rates may be used to determine a rationale by users for the distribution of usage time for a particular application. For example, the distribution of average usage times may be due to a lack of third party integration with other applications or a presence of a competing application adopted by users of the application's community, may correlate with the distribution of usage times.

A user's length of usage of the application 219 can be predicted by the analysis module 211 based up needs of the user by examining a user's usage of similar applications and/or determining whether the application being evaluated fits into an ecosystem of other applications used by the user. For example, by reviewing integration points the application 219 being reviewed can fulfill. Based on the mean usage periods of the application 219 by other users, analysis module 211 can predict whether the usage period of the user being evaluated will be less than, equal to or longer than the typical usage period for the application 219. Based on the predicted length of usage predicted by the analysis module 211, embodiments of analysis module 211 may recommend alternative applications having similar functionalities but may be predicted to have a longer predicted period of usage. Moreover, based on the predicted lengths of application usage for a particular user, the analysis module 211 may pre-emptively predict when an application may be optimally uninstalled from the user device 205, preventing applications 219 that have exceeded their predicted usage periods from occupying storage space on the user device 205 unnecessarily.

In some embodiments, analysis module 211 may consider social media interactions by users within an application community, friends of users or other types of social connections on a social media platform when determining whether to uninstall an application 219 or make an uninstallation recommendation. Users may opt into having the data collection module 209 collect social media data and have the analysis module 211 analyze social media interactions. For example, by opting in via the user configurations 207. During analysis of collected application storefront data and logs 221 for each application 219 of the user device 205, the analysis module 211 may further take into consideration social media interactions. For example, if friends or social connections of the user access and maintain an application 219 on a user device 205, the analysis module 211 may forego uninstallation of the application 219 or not recommend the application 219 for uninstallation. Alternatively, in some embodiments, the analysis module 211 may not only recommend uninstallation of an application 219 for a user device 205 but may further recommend uninstallation of the application 219 for all friends and social connections of the user being recommended to uninstall the application. For example, by sending a notification or prompt recommending uninstallation to all users within a friend group via either messaging services built into the reporting module 215 of the application management module 203 and/or using messaging services available via a social media platform.

Embodiments of the application management module 203 may include reporting module 215. The reporting module 215 may perform the functions, tasks and/or processes of the application management module 203 of transmitting, reporting and/or displaying notifications to the user device 205 from the application management module 203. Reporting module 215 may present the analysis, determinations, managing actions and/or recommendations from the analysis module 211, and may further include a detailed analysis or report explaining the recommendations, actions or other determinations for managing applications 219 of the user device 205. For example, upon initial setup and identification of applications 219 installed or accessible by the user device 205, and/or at period intervals of re-evaluation of applications 219, reporting module 215 may generate a list installed applications that are recommended for uninstallation and/or have been subject to a managing action by the application management module 203 that automatically uninstalled the application(s) 219. Moreover, the list provided by the reporting module 215 may provide the rationale for the recommendations or actions taken by the application management module 203. For example, the list of applications provided by the reporting module 215 may indicate reasons including a low, rare or infrequent usage rate of the application 219 by the user, crowd-sourced feedback such as ratings, rankings, and other metrics of user satisfaction below a threshold level, a high uninstallation rate for a set period of time above a configured threshold, negative reviews or comments about the application published by other users of the application storefront, etc.

Upon receiving a report or list from the reporting module 215, a user may view the report or list of applications 219 along with any managing actions or recommendations. A user can interface with the application management module 203 via the app management API 232 and may confirm managing actions, undo managing actions and/or select which recommendations to execute. For example, a user may confirm uninstallations or reinstallations of one or more listed applications 219; undo uninstallation or reinstallation actions automatically performed by the application management module 203; and/or select one or more applications 219 from the list or report and accept or deny the recommendations as presented. For instance, if a recommendation to reinstall or uninstall an application 219 is accepted, the application management module 203 may proceed with uninstalling or reinstalling the corresponding applications 219 as recommended. Likewise, where a user denies the recommendation to uninstall or reinstall an application, the recommended action is not executed by the application management module 203.

In some situations, such as when removal of applications 219 are set to occur automatically, an analysis module 211 may determine that removal of one or more applications 219 that might otherwise be automatically removed should be confirmed with the user before a managing action is taken by the application management module 203. In such an embodiment, the reporting module 215 may selectively report and list only recommendations for uninstallation or reinstallation of applications 219. The reporting module 215 may hide other applications 219 that were removed autonomously while only listing the applications 219 that are requesting confirmation by the user. In other embodiments, the reporting module 215 may simply report the managing action that was applied to the autonomously managed applications 219 alongside the applications that may require input from the user before proceeding with a proposed uninstallation or reinstallation by the application management module 203.

For example, A user downloads or accesses the application management module 203 on the user device 205 to help clean up the user device 205 since the user has hundreds of old applications the user never uses and some that were once highly popular but have lost their high degree of positive user feedback and the ratings have dropped over time on the application storefront. After installing or remotely accessing the application management module 203 on the user device 205, the user receives an initial message that a total of 78 applications can potentially be deleted or uninstalled if the user agrees to this managing action. Alternatively, in a similar example where the user has configured the user configurations 207 while setting up the application management module 203, the user set the deletion triggering flag setting to autonomous, so the application management system 201 now has the capability to uninstall all 78 applications without user's confirmation. In some situations, the application management module 203 may examine the user's application usage log and observe that there are 12 applications the user still uses, even though the popularity of the 12 applications has dropped considerably. In such a situation, the application management module 203 can provide a push notification or other type of message via the reporting module 215 listing those 12 application(s) and the application management module 203 may not take any action on those 12 applications without user approval, whereas the application management module 203 does automatically perform a managing action on the remaining 66 applications and proceeds to un-install all of the 66 applications.

Embodiments of the application management module 203 may allow users to add or provide feedback and/or comments to all manually suggested or autonomous application managing actions performed by the application management module 203, including uninstallations of applications 219 and/or reinstallations of previously uninstalled applications. Feedback module 213 may solicit and/or receive feedback from users following the receipt of notifications from the reporting module 215. For example, the receipt of one or more lists, reports, notifications, recommendations or alerts indicating the performance of a managing action that has occurred or being requested for user confirmation. A user may input information into the feedback module 213 indicating how accurate the analysis module 211 correctly predicted applications 219 that could be uninstalled from the user device 205 and/or reinstalled onto the user device. Feedback provided by the user to the feedback module may be used to automatically update weighted scoring within the models used by the analysis module 211 based on whether or not the user followed the recommendations and/or agreed that autonomous actions predicted to be acceptable to the user were indeed accurate. Moreover, users may provide feedback to indicate whether or not alternative applications with higher metrics for user satisfaction were accurate recommendations and/or whether or not the recommended alternative applications were improvements over the application(s) being replaced by the alternative application.

Method for Dynamically Managing the Uninstallation of Software Applications

Figure 6A:
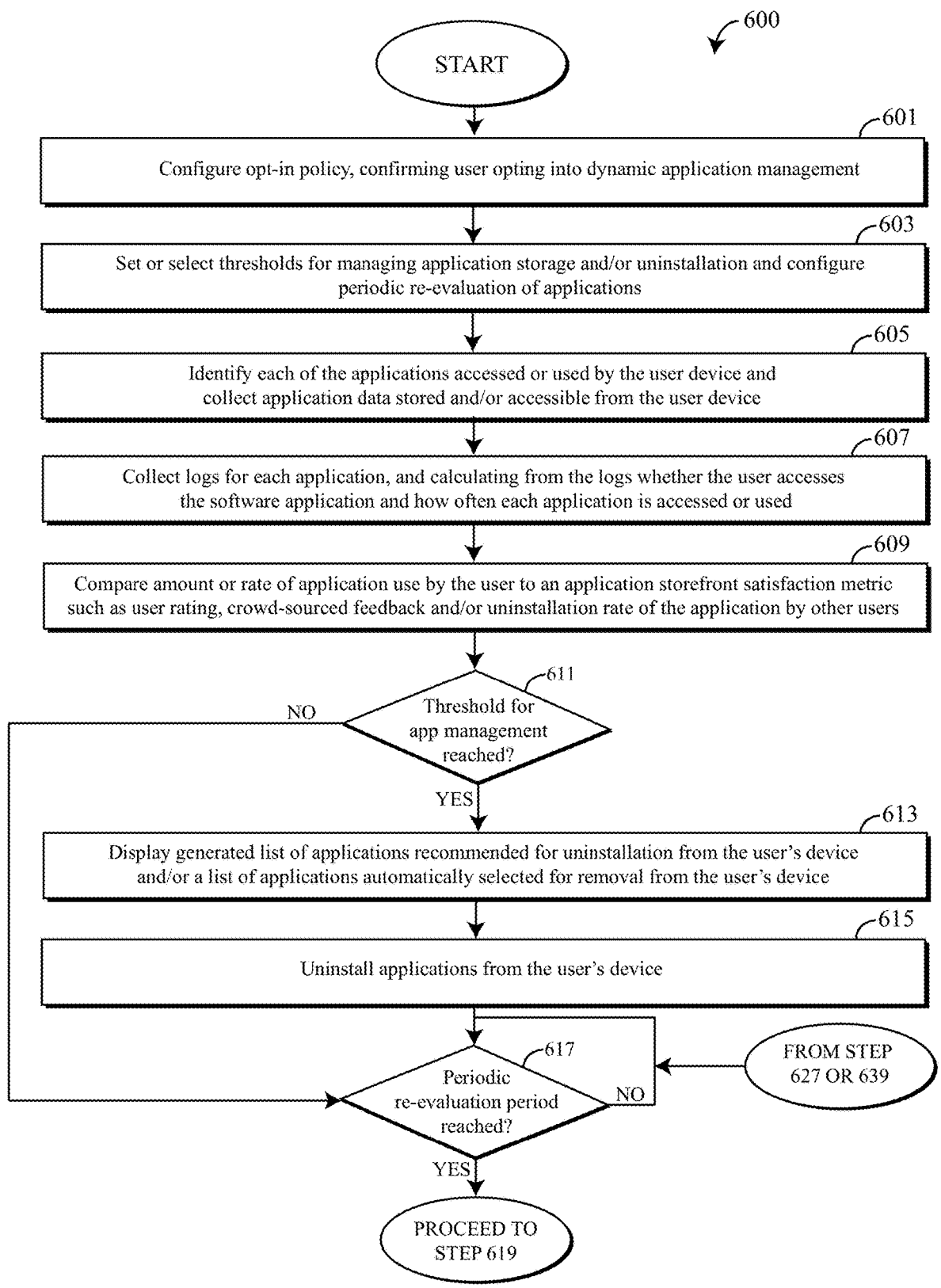
FIG. 6A depicts a flow diagram describing an embodiment of a method for dynamically managing the uninstallation of software applications based on user ratings or other crowd-sourced feedback in accordance with the present disclosure.
Figure 6B:
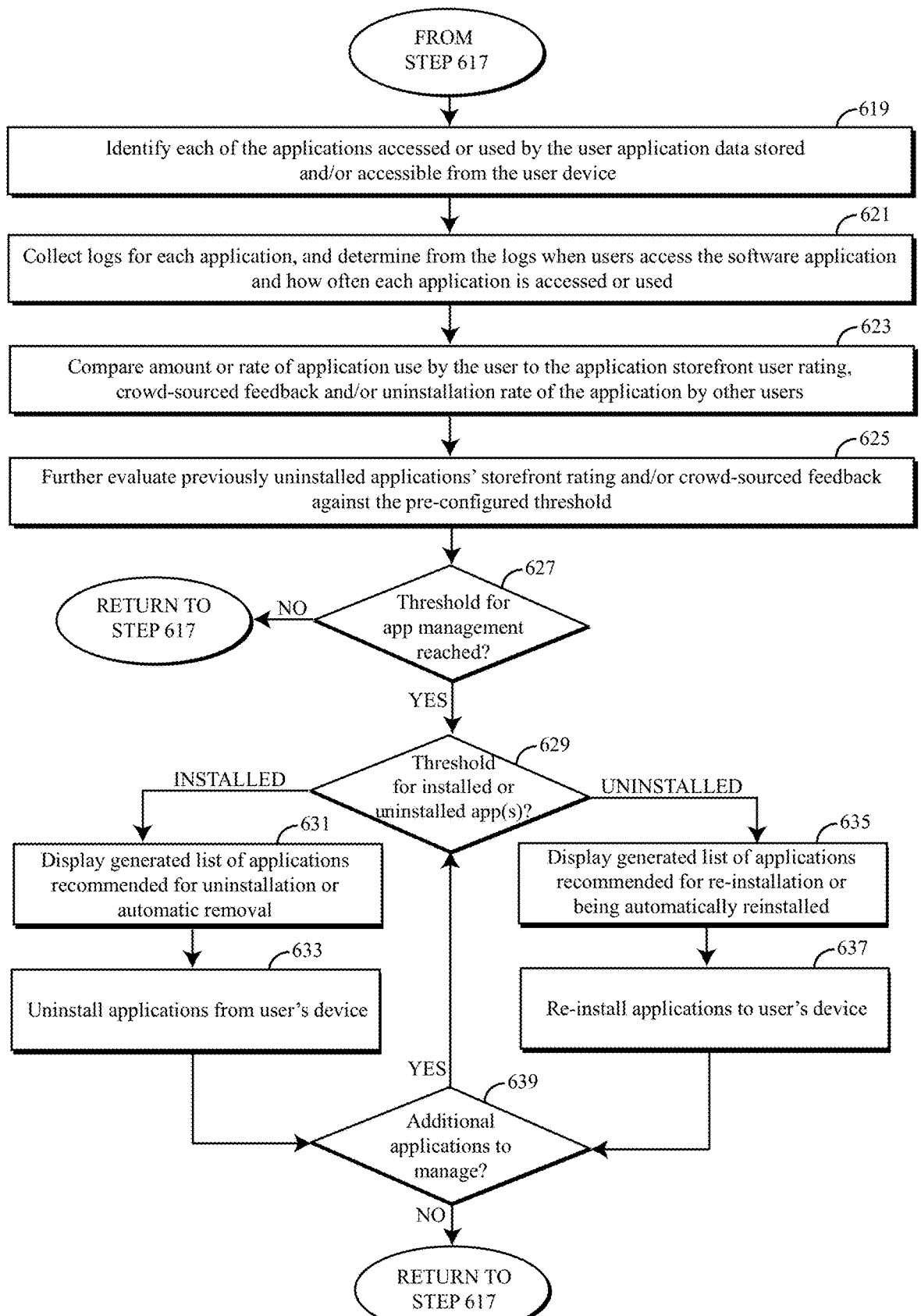
FIG. 6B depicts a flow diagram that is a continuation of the flow diagram of FIG. 6A describing the embodiment of the method for dynamically managing the uninstallation of software applications based on user ratings or other crowd-sourced feedback in accordance with the present disclosure.

The drawings of FIGS. 6A-6B represents an embodiment of a method for dynamically managing the uninstallation of software applications based on user ratings or crowd-sourced feedback, as described in accordance with FIGS. 2-5 above, using one or more computing systems defined generically by computing system 100 of FIGS. 1A-1B; and more specifically by the embodiments of specialized computer systems depicted in FIGS. 2-5 and as described herein. A person skilled in the art should recognize that the steps of the method described in FIGS. 6A-6B may be performed in a different order than presented and may not require all the steps described herein to be performed.

The embodiment of the method 600 may begin at step 601. During step 601 a policy governing collected data by the application management module 203 can be configured by a user via an app management API. User configurations 207 comprising the user's assent for opting into the policy can be created, updated and/or store, establishing one or more settings for dynamically managing applications 219 of one or more user device(s) 205 authorized by the user. The user can further configure the policies stored by the user configurations 207 to include a level of anonymization to protect the privacy of a user opting into the management of applications by the application management module 203.

In step 603, user configurations 207 can be further set up or configured to establish one or more selected thresholds for managing applications 219 stored or installed onto a user device 205. During step 603, user configurations can establish thresholds for rates of use, types and levels of acceptable crowd-source feedback being considered for the uninstallation of the applications, including reviews, rankings, comments, feedback, uninstallation rates of other users, etc. Moreover, during step 603, users may establish periods of time upon which re-evaluations of applications 219 may periodically occur.

In step 605, the data collection module 209 may scan a user device 205 to identify each of the applications 219 installed, used or accessed by the user device 205. Data collection module 209 may access and retrieve application data stored by the user device 205 as well as any data stored by the application storefront servers 217. In step 607, the data collection module 209 may further collect logs 221 associated with each application and determine from the logs 221 when a user accesses a software application 219 and how often each application 219 is accessed or used. Logs 221 may be retrieved from storage of the user device 205, and/or the application storefront server 217. Data collection module 209 may query the application storefront server 217 and request logs for specific applications 219 of interest for specific users. A copy of the logs 221 may be transmitted to the data collection module 209 of the application management module 203 via the computer network 250.

In step 609, the rate of application use by the user for each application 219 calculated in step 607 may be compared with one or more metrics of user satisfaction. For example, embodiments of the analysis module 211 may compare an amount or rate of use for each application 219 by the user and application storefront data comprising crowd-sourced user feedback, including user ratings, rankings, uninstallation rates, review sentiment, feedback, etc., to the thresholds configured in the user configurations 207. In step 611, a determination is made whether a threshold for user rate of use and/or any of the available metrics for tracking user satisfaction have been reached or established which would trigger an application to be managed by the application management module 203. If none of the configured thresholds or conditions for triggering a managing action have been met, the method 600 may proceed from step 611 to step 617. Alternatively, if a threshold or condition for triggering a managing action has been met in step 617, the method may proceed to step 613.

In step 613 of method 600, a list may be generated and displayed by the user device 205 comprising one or more applications 219 recommended for uninstallation by the analysis module 211 and/or the list may comprise one or more applications 219 that may have automatically been selected for removal from the user device 205. During step 613, a user may confirm or deny recommendations for uninstallation and/or may override or reverse automatically applied managing actions scheduling the removal of the applications 219 from the user device. In step 615, applications 219 selected for removal either manually by the user or automatically, may be uninstalled from the user device 205.

In step 617 of method 600, a determination may be made at periodic intervals of time established by the user configurations 207 and/or automatically by the application management module 203 to re-evaluate applications 219 installed, access and/or previously uninstalled by the user device 205. If during the determination of step 617, the interval of time for a periodic re-evaluation period has not been reached, the method 600 may periodically re-check whether the interval of time has been reached for the period of re-evaluation. Once the determination is made that the time frame for periodic re-evaluation of the applications 219 has been reached, the method 600 may proceed to step 619.

In Step 619, the data collection module 209 may re-scan the user device in order to identify each of the applications installed, used or accessed by the user, and collect application data stored and/or accessible by the user device 205, as well as collect any application data corresponding to the applications 219 detect by the data collection module 209 that may be available via the application storefront server 217. In step 621, the data collection module 209 may collect new and/or updated logs 221 for each application 219 detected in step 619. The data collection module 209 may transfer a copy of the logs 221 to the analysis module 211, wherein each of the logs 221 can be analyzed to identify when users accessed the applications 219, and how often each application is accessed or used during a configured period of time. In step 623, the rate of application use by the user for a configured period of time may be compared and/or one or more metrics for evaluating user satisfaction provided by the application storefront, including rankings, uninstallation rates and other crowd-sourced feedback such as reviews, comments, feedback, etc., may be compared with the configured thresholds for both rate of use and metrics of user satisfaction. In step 625, further evaluation may be performed to evaluate previously uninstalled applications of storefront ratings, uninstallation rates, rankings or other metrics of user satisfaction against the configured thresholds of user satisfaction.

In step 627, a determination is made whether any of the applications 219 being compared to the configured thresholds reach a threshold level for a managing action to occur, such as uninstallation or re-installation of an application 219. If neither an existing application or a previously uninstalled application reach the threshold for a managing action to trigger, the method 600 may return to step 617 and wait for the next re-evaluation period to trigger. Conversely, when at least one existing application or previously uninstalled application trigger a threshold for a managing action to occur, the method 600 may proceed to step 629. During step 629 a determination is made whether the threshold triggered in step 627 is for an installed application or a previously uninstalled application. If the application 219 triggering the configured threshold for a managing action is an installed application, the method may proceed to step 631, whereas if a determination is made that the application 219 triggering the threshold is for an uninstalled application, then the method may proceed to step 635.

In step 631 of method 600, a list of one or more installed applications may be displayed with recommendations for removal or uninstallation from the user device 205 and/or notifications to the user device 205 of automatic uninstallations or removals performed in accordance with user configurations 207. The user may select applications to uninstall, confirm automatically uninstalled application 219, override automatic uninstallations and/or reverse automated uninstallations that may have occurred. In step 633, the number of managing actions selected in step 631 may be executed, including the uninstallation of application(s) from the user device 205. Moreover, in step 633 and automated uninstallations reversed by the user in step 631 may be executed in step 633 to override automated managing actions.

In step 635, a generated list may be displayed by the user device 205 comprising previously uninstalled applications recommended for re-installation and/or a notification describing actions implemented on previously uninstalled applications reinstalled onto the user device 205. During step 635, a user may confirm which previously uninstalled applications should be reinstalled, based on the recommendations of the generated list, undo automatic installations of previously uninstalled applications and confirm or override upcoming automated managing actions to reinstall previously uninstalled applications. In step 637, the managing actions selected or confirmed in step 635 may be executed, including the reinstallation of previously uninstalled applications to the user device 205. Moreover, any automated managing actions overridden or reversed by the user in step 635 may be executed. For example, where a previously uninstalled application is automatically reinstalled and the user chose to undo the automated action in step 635, the installation of the previously uninstalled application may be reversed.

In step 639, a determination may be made whether or not any additional managing actions were triggered in step 627 that may still need attention or confirmation by the user. If additional applications need a managing action implemented (either manual or automated) method 600 may return to step 629 to further determine whether the application being managed is a currently installed application or a previously uninstalled application. Otherwise, if there are not any additional managing actions, the method may proceed back to step 617 and away the next period of re-evaluation to be triggered.

What is claimed is:

1. A computer-implemented method for dynamically managing uninstallation of software applications, the method comprising:
   analyzing, by a processor, one or more software applications accessed by a user device;
   collecting, by the processor, one or more logs corresponding to the one or more applications accessed by the user device;
   calculating, by the processor, a rate that the user device accesses each of the one or more software applications using the one or more logs corresponding to the one or more applications;
   comparing, by the processor, the rate that the user device accesses the one or more software applications and a metric of user satisfaction presented by an application storefront that provides access to the one or more software applications, with a configured threshold level;
   managing, by the processor, the uninstallation of the one or more software applications from the user device based on the metric of user satisfaction being below the configured threshold level, wherein determining the metric of user satisfaction is below the configured threshold level is based on normalizing the metric of user satisfaction for the one or more software applications of the user device with metrics of user satisfaction for software applications of the application storefront similar to the one or more software applications of the user device or within a same category of classification as the one or more software applications accessed by the user device; and
   uninstalling, by the processor, the one or more software applications from the user device.

2. The computer-implemented method of claim 1, wherein the uninstalling is based on the metric of user satisfaction falling below the configured threshold level.

3. The computer-implemented method of claim 2, wherein the metric of user satisfaction is selected from the group consisting of user ratings, crowd-sourced feedback, uninstallation rate of the one or more software applications by users of the application storefront, and a combination thereof.

4. The computer-implemented method of claim 1, further comprising:
   displaying, by the processor, a generated list of the one or more software applications of the user device with the rate that the user device accesses the one or more software applications or the metric of user satisfaction below the configured threshold level, and a recommendation for uninstalling the one or more software applications.

5. The computer-implemented method of claim 4, wherein the generated list further comprises recommended alternative software applications for installation onto the user device, replacing the one or more software applications recommended for uninstallation.

6. The computer-implemented method of claim 2, further comprising:
   configuring a deletion triggering flag setting to autonomous; and
   automatically uninstalling the one or more software applications upon the metric of user satisfaction falling below the configured threshold level unless the rate that the user device accesses the one or more software applications is above the threshold level.

7. The computer-implemented method of claim 1, further comprising:
   periodically re-evaluating, by the processor, previously uninstalled software applications with a most recent metric of user satisfaction published by the application storefront; and
   reinstalling, by the processor, the previously uninstalled software applications to the user device upon the most recent metric of user satisfaction rising above the configured threshold level.

8. A computer program product for dynamically managing the uninstallation of software applications comprising:
   one or more computer readable storage media having computer-readable program instructions stored on the one or more computer readable storage media, said program instructions executes a computer-implemented method comprising:

analyzing, by a processor, one or more software applications accessed by a user device;

collecting, by the processor, one or more logs corresponding to the one or more applications accessed by the user device;

calculating, by the processor, a rate that the user device accesses each of the one or more software applications using the one or more logs corresponding to the one or more applications;

comparing, by the processor, the rate that the user device accesses the one or more software applications and a metric of user satisfaction presented by an application storefront that provides access to the one or more software applications with a configured threshold level;

managing, by the processor, the uninstallation of the one or more software applications from the user device based on the metric of user satisfaction being below the configured threshold level, wherein determining the metric of user satisfaction is below the configured threshold level is based on normalizing the metric of user satisfaction for the one or more software applications of the user device with metrics of user satisfaction for software applications of the application storefront similar to the one or more software applications of the user device or within a same category of classification as the one or more software applications accessed by the user device; and uninstalling, by the processor, the one or more software applications from the user device.

9. The computer program product of claim 8, wherein the uninstalling is based on the metric of user satisfaction falling below the configured threshold level.

10. The computer program product of claim 9 wherein herein the metric of user satisfaction is selected from the group consisting of user ratings, crowd-sourced feedback, uninstallation rate of the one or more software applications by users of the application storefront, and a combination thereof.

11. The computer program product of claim 8, further comprising:
displaying, by the processor, a generated list of the one or more software applications of the user device with the rate that the user device accesses the one or more software applications or the metric of user satisfaction below the configured threshold level, and a recommendation for uninstalling the one or more software applications.

12. The computer program product of claim 11, wherein the generated list further comprises recommended alternative software applications for installation onto the user device, replacing the one or more software applications recommended for uninstallation.

13. The computer program product of claim 9 further comprising:
configuring a deletion triggering flag setting to autonomous; and
automatically uninstalling the one or more software applications upon the metric of user satisfaction falling below the configured threshold level unless the rate that the user device accesses the one or more software applications is above the configured threshold level.

14. The computer program product of claim 8 further comprising:
periodically re-evaluating, by the processor, previously uninstalled software applications with a most recent metric of user satisfaction published by the application storefront; and
reinstalling, by the processor, the previously uninstalled software applications to the user device upon the most recent metric of user satisfaction rising above the configured threshold level.

15. A computer system for dynamically managing the uninstallation of software applications comprising:
a processor; and
a computer-readable storage media coupled to the processor,
wherein the computer-readable storage media contains program instructions executing a computer-implemented method comprising:
analyzing, by the processor, one or more software applications accessed by a user device;
collecting, by the processor, one or more logs corresponding to the one or more applications accessed by the user device;
calculating, by the processor, a rate that the user device accesses each of the one or more software applications using the one or more logs corresponding to the one or more applications;
comparing, by the processor, the rate that the user device accesses the one or more software applications and a metric of user satisfaction presented by an application storefront that provides access to the one or more software applications with a configured threshold level;
managing, by the processor, the uninstallation of the one or more software applications from the user device based on the metric of user satisfaction being below the configured threshold level, wherein determining the metric of user satisfaction is below the configured threshold level is based on normalizing the metric of user satisfaction for the one or more software applications of the user device with metrics of user satisfaction for software applications of the application storefront similar to the one or more software applications of the user device or within a same category of classification as the one or more software applications accessed by the user device; and
uninstalling, by the processor, the one or more software applications from the user device.

16. The computer system of claim 15, wherein the uninstalling is based on the metric of user satisfaction falling below the configured threshold level, and the metric of user satisfaction is selected from the group consisting of user ratings, crowd-sourced feedback, uninstallation rate of the one or more software applications by users of the application storefront, and a combination thereof.

17. The computer system of claim 15, further comprising:
periodically re-evaluating, by the processor, previously uninstalled software applications with a most recent metric of user satisfaction published by the application storefront; and
reinstalling, by the processor, the previously uninstalled software applications to the user device upon the most recent metric of user satisfaction rising above the configured threshold level.

* * * * *